United States Patent
Oyama et al.

(10) Patent No.: US 8,209,103 B2
(45) Date of Patent: Jun. 26, 2012

(54) HYBRID VEHICLE AND CONTROL METHOD OF HYBRID VEHICLE

(75) Inventors: Shunsuke Oyama, Toyota (JP); Yasuhiro Kaya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 742 days.

(21) Appl. No.: 11/995,003

(22) PCT Filed: Jul. 13, 2006

(86) PCT No.: PCT/JP2006/314316
§ 371 (c)(1),
(2), (4) Date: Jan. 8, 2008

(87) PCT Pub. No.: WO2007/010953
PCT Pub. Date: Jan. 25, 2007

(65) Prior Publication Data
US 2009/0088913 A1 Apr. 2, 2009

(30) Foreign Application Priority Data
Jul. 15, 2005 (JP) .................................. 2005-206908

(51) Int. Cl.
*G06F 19/00* (2011.01)
*G06G 7/70* (2006.01)

(52) U.S. Cl. .............. 701/101; 701/51; 701/53; 701/54; 701/65; 701/99; 180/65.21; 180/65.262; 180/65.28

(58) Field of Classification Search .... 180/65.21–65.29, 180/65.8; 701/22, 51, 53, 54, 65, 69, 99, 701/101, 102, 110; 477/2, 3, 77, 78, 107
See application file for complete search history.

(56) References Cited

U.S. PATENT DOCUMENTS

| | | | |
|---|---|---|---|
| 5,635,903 A * | 6/1997 | Koike et al. | 340/441 |
| 5,642,707 A * | 7/1997 | Cerf et al. | 123/339.23 |
| 6,208,034 B1 | 3/2001 | Yamaguchi | |
| 6,543,395 B2 * | 4/2003 | Green | 123/27 GE |
| 6,853,893 B2 * | 2/2005 | Corcione et al. | 701/22 |
| 7,024,871 B2 * | 4/2006 | Zhu et al. | 62/133 |
| 7,222,004 B2 * | 5/2007 | Anderson | 701/22 |
| 7,292,932 B1 * | 11/2007 | Ledger et al. | 701/110 |
| 7,357,204 B2 * | 4/2008 | Hisada et al. | 180/65.285 |
| 2003/0173123 A1 | 9/2003 | Nakanowatari | |
| 2004/0112652 A1 * | 6/2004 | Esposito Corcione et al. | 180/65.2 |
| 2005/0082097 A1 * | 4/2005 | Ichimoto et al. | 180/65.2 |
| 2007/0089704 A1 * | 4/2007 | Jacobsson et al. | 123/299 |
| 2008/0091309 A1 * | 4/2008 | Walker | 701/1 |

(Continued)

FOREIGN PATENT DOCUMENTS

JP     6 144020     5/1994

(Continued)

*Primary Examiner* — Hussein Elchanti
*Assistant Examiner* — Rami Khatib
(74) *Attorney, Agent, or Firm* — Oblon, Spivak, McClelland, Maier & Neustadt, L.L.P.

(57) ABSTRACT

The drive control of the invention adopted in a hybrid vehicle specifies an operation line L to give a greater torque in a low rotation speed area of an engine with an increase in vehicle speed and controls the operation of the engine according to the specified operation line L. The engine can thus be driven at a higher-efficiency drive point, while the driving-related background noise effectively masks some abnormal noise or muffled noise, which may be caused by the operation of the engine in a low rotation speed-high torque area. This arrangement desirably prevents the driver and the other passenger from feeling odd and uncomfortable due to the abnormal noise or muffled noise and enhances the energy efficiency of the hybrid vehicle.

19 Claims, 8 Drawing Sheets

FOREIGN PATENT DOCUMENTS

| | | |
|---|---|---|
| JP | 9 201005 | 7/1997 |
| JP | 11 103501 | 4/1999 |
| JP | 2001 164960 | 6/2001 |
| JP | 2005 127185 | 5/2005 |
| JP | 2005 180331 | 7/2005 |
| JP | 2006 2740 | 1/2006 |

\* cited by examiner

HYBRID VEHICLE AND CONTROL METHOD OF HYBRID VEHICLE

TECHNICAL FIELD

The present invention relates to a hybrid vehicle and a control method of the hybrid vehicle.

BACKGROUND ART

One proposed hybrid vehicle is driven with torque conversion of the output power of an engine by means of a planetary gear mechanism and two motors (see, for example, Japanese Patent Laid-Open Gazette No. 2005-127185). When a driving power demand to be output from the engine is in a muffled noise area of the engine, this proposed hybrid vehicle sets a hysteresis to operate the engine at a drive point close to the boundary of the muffled noise area. This suppresses generation of the muffled noise.

DISCLOSURE OF THE INVENTION

In such a hybrid vehicle with an arbitrary variation in drive point of the engine, it is required to operate the engine in an area free from muffled noise in order to prevent the driver and the other passengers from feeling odd or uncomfortable. A further enhancement of the energy efficiency of the hybrid vehicle is also demanded for the better utilization of energy resources.

The hybrid vehicle of the invention and the control method of the hybrid vehicle thus aim to prevent the driver and the other passengers from feeling odd or uncomfortable due to some abnormal noise or muffled noise of an internal combustion engine. The hybrid vehicle of the invention and the control method of the hybrid vehicle also aim to enhance the energy efficiency.

In order to attain at least part of the above and the other related objects, the hybrid vehicle of the invention and the control method of the hybrid vehicle have the configurations discussed below.

The present invention is directed to a first hybrid vehicle. The first hybrid vehicle includes: an internal combustion engine that has an output shaft and outputs power; an electric power-mechanical power input output mechanism that is connected to the output shaft of the internal combustion engine and to an axle of the hybrid vehicle and transmits at least part of output power of the internal combustion engine to the axle through input and output of electric power and mechanical power; a motor that is capable of outputting power for driving the hybrid vehicle; an accumulator unit that inputs and outputs electric power from and to the electric power-mechanical power input output mechanism and the motor; a noise level detection module that detects a level of driving-related noise; a driving force demand setting unit that sets a driving force demand required for driving the hybrid vehicle; an operation restriction setting module that sets an operation restriction to be imposed on operation of the internal combustion engine, based on the detected noise level; and a control module that controls the internal combustion engine, the electric power-mechanical power input output mechanism, and the motor to operate the internal combustion engine with the imposed operation restriction and to drive the hybrid vehicle with a driving force equivalent to the set driving force demand.

The first hybrid vehicle of the invention sets the operation restriction to be imposed on the operation of the internal combustion engine, based on the level of driving-related noise and controls the internal combustion engine, the electric power-mechanical power input output mechanism, and the motor to operate the internal combustion engine with the imposed operation restriction and to drive the hybrid vehicle with a driving force equivalent to a driving force demand required for driving the hybrid vehicle. The driving-related noise masks the abnormal noise or muffled noise caused by the operation of the internal combustion engine. The operation restriction to be imposed on the operation of the internal combustion engine is thus set according to the level of driving-related noise to prevent the driver and the other passengers from feeling odd or uncomfortable due to the abnormal noise or muffled noise. The internal combustion engine is then operated with this operation restriction. This arrangement effectively prevents the driver and the other passengers from feeling odd or uncomfortable due to the abnormal noise or muffled noise. Setting the operation restriction according to the level of driving-related noise enables a degree of freedom in operation restriction to be varied according to the level of driving-related noise. The operation restriction to be imposed on the operation of the internal combustion engine may thus be set to enhance an efficiency of the internal combustion engine for a fixed output level to the extent that prevents the driver and the other passengers from feeling odd or uncomfortable due to the abnormal noise or muffled noise. Such setting of the operation restriction desirably increases the efficiency of the internal combustion engine and thus enhances the energy efficiency of the hybrid vehicle. Here the 'level of driving-related noise' preferably excludes noise caused by normal operation of the internal combustion engine.

In the first hybrid vehicle of the invention, the operation restriction setting module may set the operation restriction, which is to be imposed on the operation of the internal combustion engine, so as to enhance an efficiency of the internal combustion engine for a fixed output level with an increase in detected noise level. This arrangement enhances the efficiency of the internal combustion engine.

In the first hybrid vehicle of the invention, the operation restriction setting module may set the operation restriction, which is to be imposed on the operation of the internal combustion engine, so as to increase a torque in a low rotation speed area of the internal combustion engine, which is not higher than a preset reference rotation speed, with an increase in detected noise level. The operation restriction setting module may also set the operation restriction, which is to be imposed on the operation of the internal combustion engine, so as to raise an allowable level of muffled noise caused by the operation of the internal combustion engine with an increase in detected noise level.

In one preferable application of the first hybrid vehicle of the invention, the noise level detection module has a vehicle speed measurement unit that measures a vehicle speed of the hybrid vehicle. The noise level detection module sets a higher noise level corresponding to a higher measured vehicle speed. The operation of the internal combustion engine according to the vehicle speed more effectively prevents the driver and the other passengers from feeling odd or uncomfortable due to the abnormal noise or muffled noise.

The present invention is directed to a second hybrid vehicle. The second hybrid vehicle includes: an internal combustion engine that has an output shaft and outputs power; an electric power-mechanical power input output mechanism that is connected to the output shaft of the internal combustion engine and to an axle of the hybrid vehicle and transmits at least part of output power of the internal combustion engine to the axle through input and output of electric power and mechanical power; a motor that is capable of outputting power for driving the hybrid vehicle; an accumulator unit that inputs and outputs electric power from and to the electric power-mechanical power input output mechanism and the motor; a driving force demand setting unit that sets a driving force demand required for driving said hybrid vehicle; a vehicle speed measurement unit that measures a vehicle speed of the hybrid vehicle; an operation restriction setting module that sets an operation restriction, which is to be imposed on operation of the internal combustion engine, so as to increase a torque in a low rotation speed area of the internal combustion engine, which is not higher than a preset reference rotation speed, with an increase in measured vehicle speed; and a control module that controls the internal combustion engine, the electric power-mechanical power input output mechanism, and the motor to operate the internal combustion engine with the imposed operation restriction and to drive the hybrid vehicle with a driving force equivalent to the set driving force demand.

The second hybrid vehicle of the invention sets the operation restriction, which is to be imposed on the operation of the internal combustion engine, so as to increase the torque in the low rotation speed area of the internal combustion engine, which is not higher than the preset reference rotation speed, with an increase in vehicle speed of the hybrid vehicle, and controls the internal combustion engine, the electric power-mechanical power input output mechanism, and the motor to operate the internal combustion engine with the imposed operation restriction and to drive the hybrid vehicle with a driving force equivalent to a driving force demand required for driving the hybrid vehicle. The driving-related noise increases with an increase in vehicle speed. The driving-related noise masks the abnormal noise or muffled noise caused by the operation of the internal combustion engine. The internal combustion engine often causes muffled noise in a low rotation speed-high torque area, while having a higher efficiency at a higher torque in a low rotation speed area. The operation restriction to be imposed on the operation of the internal combustion engine is thus set to increase the torque in the low rotation speed area of the internal combustion engine, which is not higher than the preset reference rotation speed, with an increase in vehicle speed of the hybrid vehicle. The internal combustion engine is then operated with the imposed operation restriction. This arrangement effectively prevents the driver and the other passengers from feeling odd or uncomfortable due to the abnormal noise or muffled noise, while enhancing the efficiency of the internal combustion engine.

In the first hybrid vehicle and the second hybrid vehicle of the invention, the electric power-mechanical power input output mechanism may include: a three shaft-type power input output module that is linked to three shafts, the output shaft of the internal combustion engine, the axle, and a rotating shaft, and inputs and outputs power from and to a residual one shaft based on powers input from and output to any two shafts among the three shafts; and a generator that inputs and outputs power from and to the rotating shaft. The electric power-mechanical power input output mechanism may also be a pair-rotor motor that has a first rotor connected to the output shaft of the internal combustion engine and a second rotor connected to the axle, and is driven to rotate through relative rotation of the first rotor to the second rotor.

The present invention is also directed to a control method of the first hybrid vehicle of the invention. The first hybrid vehicle includes: an internal combustion engine that has an output shaft and outputs power; an electric power-mechanical power input output mechanism that is connected to the output shaft of the internal combustion engine and to an axle of the hybrid vehicle and transmits at least part of output power of the internal combustion engine to the axle through input and output of electric power and mechanical power; a motor that is capable of outputting power for driving the hybrid vehicle; and an accumulator unit that inputs and outputs electric power from and to the electric power-mechanical power input output mechanism and the motor. The control method sets an operation restriction to be imposed on operation of the internal combustion engine, based on a level of driving-related noise, and controls the internal combustion engine, the electric power-mechanical power input output mechanism, and the motor to operate the internal combustion engine with the imposed operation restriction and to drive the hybrid vehicle with a driving force equivalent to a driving force demand required for driving the hybrid vehicle.

The control method of the first hybrid vehicle of the invention sets the operation restriction to be imposed on the operation of the internal combustion engine, based on the level of driving-related noise and controls the internal combustion engine, the electric power-mechanical power input output mechanism, and the motor to operate the internal combustion engine with the imposed operation restriction and to drive the hybrid vehicle with a driving force equivalent to a driving force demand required for driving the hybrid vehicle. The driving-related noise masks the abnormal noise or muffled noise caused by the operation of the internal combustion engine. The operation restriction to be imposed on the operation of the internal combustion engine is thus set according to the level of driving-related noise to prevent the driver and the other passengers from feeling odd or uncomfortable due to the abnormal noise or muffled noise. The internal combustion engine is then operated with this operation restriction. This arrangement effectively prevents the driver and the other passengers from feeling odd or uncomfortable due to the abnormal noise or muffled noise. Setting the operation restriction according to the level of driving-related noise enables a degree of freedom in operation restriction to be varied according to the level of driving-related noise. The operation restriction to be imposed on the operation of the internal combustion engine may thus be set to enhance an efficiency of the internal combustion engine for a fixed output level to the extent that prevents the driver and the other passengers from feeling odd or uncomfortable due to the abnormal noise or muffled noise. Such setting of the operation restriction desirably increases the efficiency of the internal combustion engine and thus enhances the energy efficiency of the hybrid vehicle.

In one preferable embodiment of the control method of the first hybrid vehicle of the invention, the control method sets the operation restriction, which is to be imposed on the operation of the internal combustion engine, so as to enhance an efficiency of the internal combustion engine for a fixed output level with an increase in level of driving-related noise and controls the internal combustion engine, the electric power-mechanical power input output mechanism, and the motor. This arrangement enhances the efficiency of the internal combustion engine.

In one application of the control method of the first hybrid vehicle of the invention, the control method sets the operation restriction, which is to be imposed on the operation of the internal combustion engine, so as to increase a torque in a low rotation speed area of the internal combustion engine, which is not higher than a preset reference rotation speed, with an increase in level of driving-related noise and controls the internal combustion engine, the electric power-mechanical power input output mechanism, and the motor. In another application of the control method of the first hybrid vehicle of the invention, the control method sets the operation restriction, which is to be imposed on the operation of the internal combustion engine, so as to raise an allowable level of muffled noise caused by the operation of the internal combustion engine with an increase in level of driving-related noise and controls the internal combustion engine, the electric power-mechanical power input output mechanism, and the motor.

In one preferable application of the control method of the first hybrid vehicle of the invention, the control method utilizes a vehicle speed of said hybrid vehicle as a parameter representing or implying the level of driving-related noise to set the operation restriction, which is to be imposed on the operation of the internal combustion engine, and controls the internal combustion engine, the electric power-mechanical power input output mechanism, and the motor. The operation of the internal combustion engine according to the vehicle speed more effectively prevents the driver and the other passengers from feeling odd or uncomfortable due to the abnormal noise or muffled noise.

The present invention is also directed to a control method of the second hybrid vehicle of the invention. The second hybrid vehicle includes: an internal combustion engine that has an output shaft and outputs power; an electric power-mechanical power input output mechanism that is connected to the output shaft of the internal combustion engine and to an axle of the hybrid vehicle and transmits at least part of output power of the internal combustion engine to the axle through input and output of electric power and mechanical power; a motor that is capable of outputting power for driving the hybrid vehicle; and an accumulator unit that inputs and outputs electric power from and to the electric power-mechanical power input output mechanism and the motor. The control method sets an operation restriction, which is to be imposed on operation of the internal combustion engine, so as to increase a torque in a low rotation speed area of the internal combustion engine, which is not higher than a preset reference rotation speed, with an increase in vehicle speed of the hybrid vehicle, and controls the internal combustion engine, the electric power-mechanical power input output mechanism, and the motor to operate the internal combustion engine with the imposed operation restriction and to drive the hybrid vehicle with a driving force equivalent to a driving force demand required for driving said hybrid vehicle.

The control method of the second hybrid vehicle of the invention sets the operation restriction, which is to be imposed on the operation of the internal combustion engine, so as to increase the torque in the low rotation speed area of the internal combustion engine, which is not higher than the preset reference rotation speed, with an increase in vehicle speed of the hybrid vehicle, and controls the internal combustion engine, the electric power-mechanical power input output mechanism, and the motor to operate the internal combustion engine with the imposed operation restriction and to drive the hybrid vehicle with a driving force equivalent to a driving force demand required for driving the hybrid vehicle. The driving-related noise increases with an increase in vehicle speed. The driving-related noise masks the abnormal noise or muffled noise caused by the operation of the internal combustion engine. The internal combustion engine often causes muffled noise in a low rotation speed-high torque area, while having a higher efficiency at a higher torque in a low rotation speed area. The operation restriction to be imposed on the operation of the internal combustion engine is thus set to increase the torque in the low rotation speed area of the internal combustion engine, which is not higher than the preset reference rotation speed, with an increase in vehicle speed of the hybrid vehicle. The internal combustion engine is then operated with the imposed operation restriction. This arrangement effectively prevents the driver and the other passengers from feeling odd or uncomfortable due to the abnormal noise or muffled noise, while enhancing the efficiency of the internal combustion engine.

BEST MODES OF CARRYING OUT THE INVENTION

Figure 1:
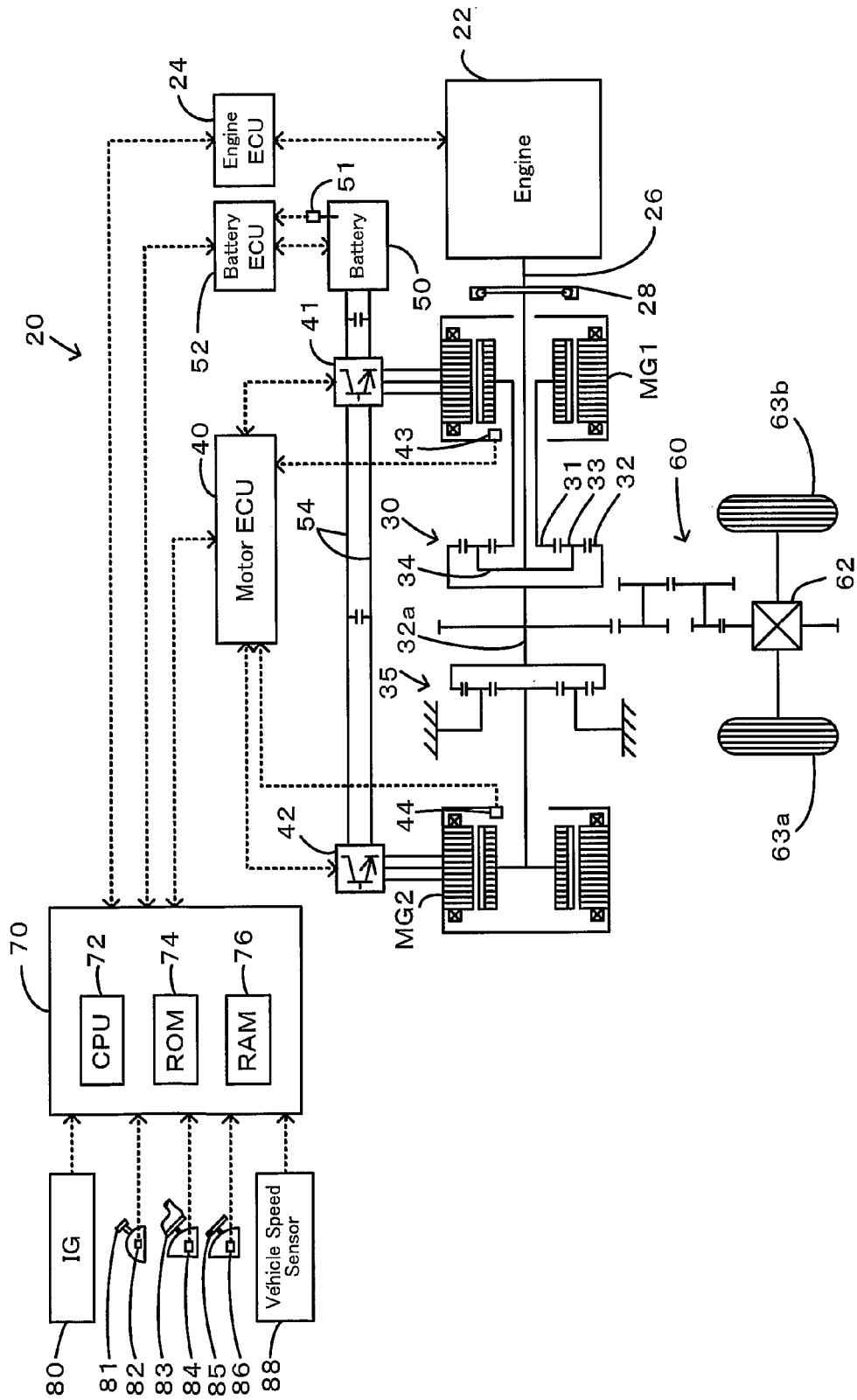
FIG. 1 schematically illustrates the configuration of a hybrid vehicle in one embodiment of the invention.

One mode of carrying out the invention is discussed below as a preferred embodiment with reference to the accompanied drawings. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
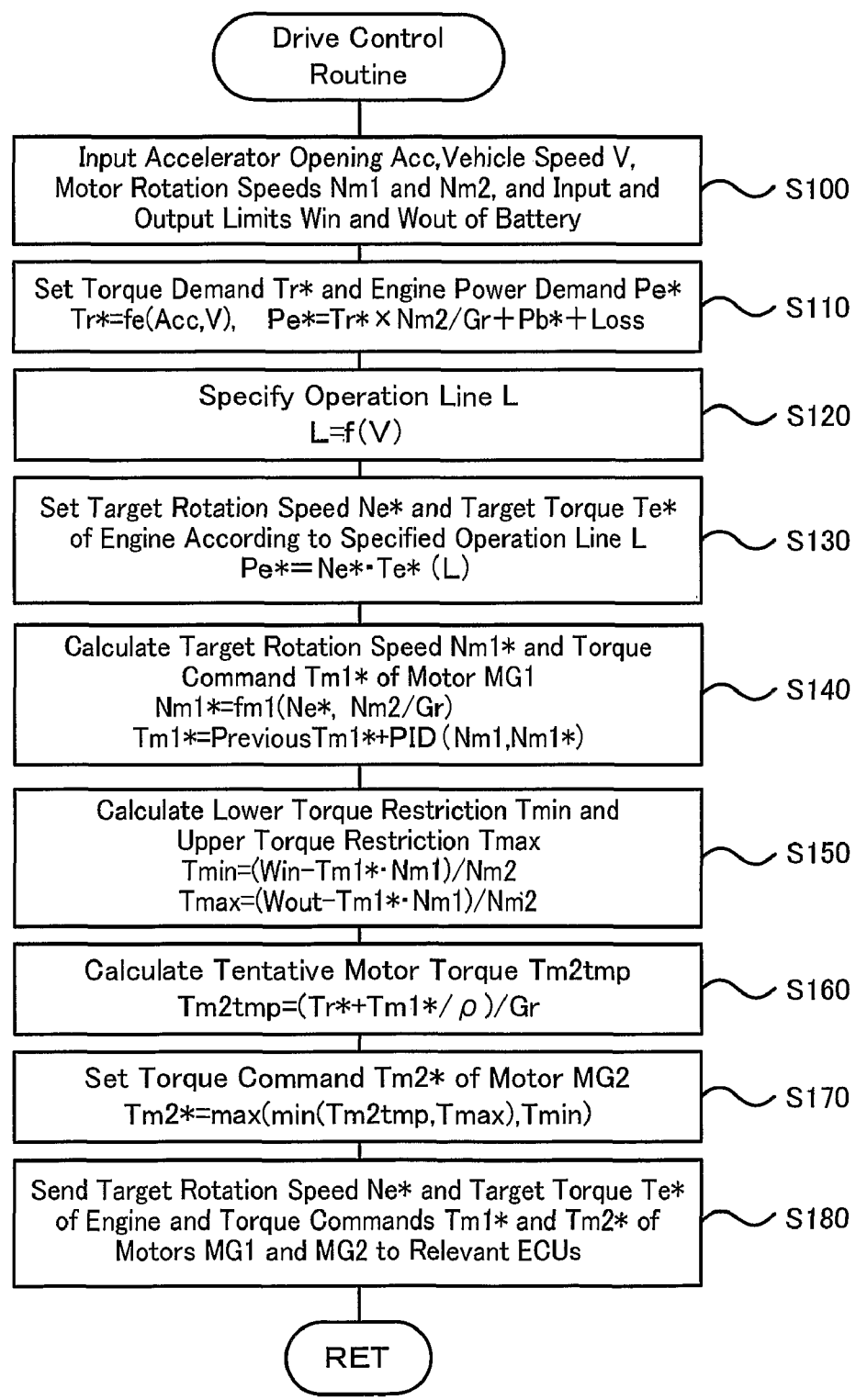
FIG. 2 is a flowchart showing a drive control routine executed by a hybrid electronic control unit mounted on the hybrid vehicle of the embodiment.

The description regards the operations of the hybrid vehicle 20 of the embodiment having the configuration discussed above. FIG. 2 is a flowchart showing a drive control routine executed by the hybrid electronic control unit 70. This drive control routine is performed repeatedly at preset time intervals, for example, at every several msec.

In the drive control routine of FIG. 2, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication.

Figure 3:
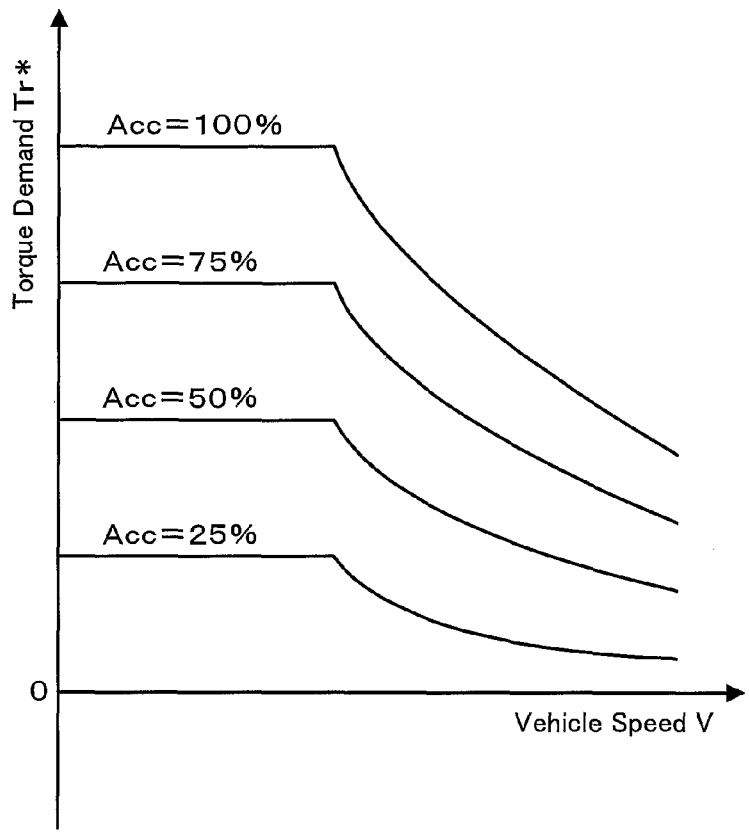
FIG. 3 shows one example of a torque demand setting map.

After the data input, the CPU 72 sets a torque demand Tr* to be output to the ring gear shaft 32a or a driveshaft linked with the drive wheels 63a and 63b as a torque required for the hybrid vehicle 20 and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 3. The engine power demand Pe* is calculated as the sum of the product of the torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 4:
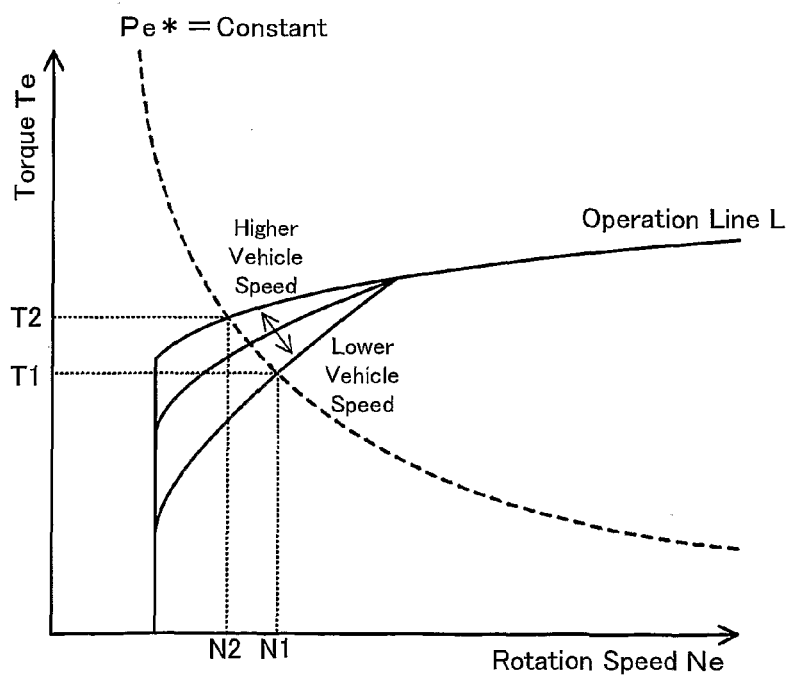
FIG. 4 shows operation lines L provided for different vehicle speeds V to set an operation point of an engine defined by a combination of rotation speed and torque.

The CPU 72 then specifies an operation line L, which is used for setting a drive point of the engine 22 defined by a target rotation speed Ne* and a target torque Te*, based on the input vehicle speed V (step S120) and sets the target rotation speed Ne* and the target torque Te* of the engine 22 according to the specified operation line L (step S130). FIG. 4 shows operation lines L provided for different vehicle speeds V to set an operation point of the engine 22 defined by a combination of rotation speed and torque. In this embodiment, the operation lines L are set to increase the torque with an increase in vehicle speed V in a relatively low rotation speed area out of the whole operation area of the engine 22. In general, the engine 22 has the higher operation efficiency at higher torques in the low rotation speed area. The higher vehicle speed V raises the driving-related noise and makes the driver and the other passengers notice the greater background noise. The operation of the engine 22 in a low rotation speed-high torque area may cause some abnormal noise or muffled noise due to the vibrations of the engine 22 and may make the driver and the other passengers feel uncomfortable and odd. The background noise increases with an increase in vehicle speed V and more effectively masks the muffled noise at the higher vehicle speed V. The drive control of this embodiment utilizes this characteristic and allows the engine 22 to be operated at the higher torque in the low rotation speed area with an increase in vehicle speed V. The engine 22 can thus be operated at a high-efficiency drive point to the extent that does not make the driver and the other passengers from feeling odd and uncomfortable due to the muffled noise. In the illustrated example of FIG. 4, a specified operation line L for the lower vehicle speed V gives a smaller torque in the low rotation speed area. An intersection of this specified operation line L and a curve of constant engine power demand Pe* gives a rotation speed N1 and a torque T1 as a drive point of the engine 22. A specified operation line L for the higher vehicle speed V gives a greater torque in the low rotation speed area. An intersection of this specified operation line L and the curve of constant engine power demand Pe* gives a rotation speed N2 and a torque T2 as a drive point of the engine 22. The vehicle speed V is thus regarded as a detection value representing the driving-related background noise or as a detection value used for estimating the driving-related background noise. At step S120, the drive control of this embodiment specifies the operation line L to give the greater torque in the relatively low rotation speed area out of the whole operation area of the engine 22 with an increase in driving-related background noise. In this embodiment, the driving-related background noise does not include the engine noise due to the operation of the engine 22 required for driving the hybrid vehicle 20.

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S140):

$$Nm1^* = Ne^* \cdot (1+\rho)/\rho - Nm2/(Gr \cdot \rho) \tag{1}$$

$$Tm1^* = \text{Previous } Tm1^* + k1(Nm1^* - Nm1) + k2\int(Nm1^* - Nm1)dt \tag{2}$$

Figure 5:
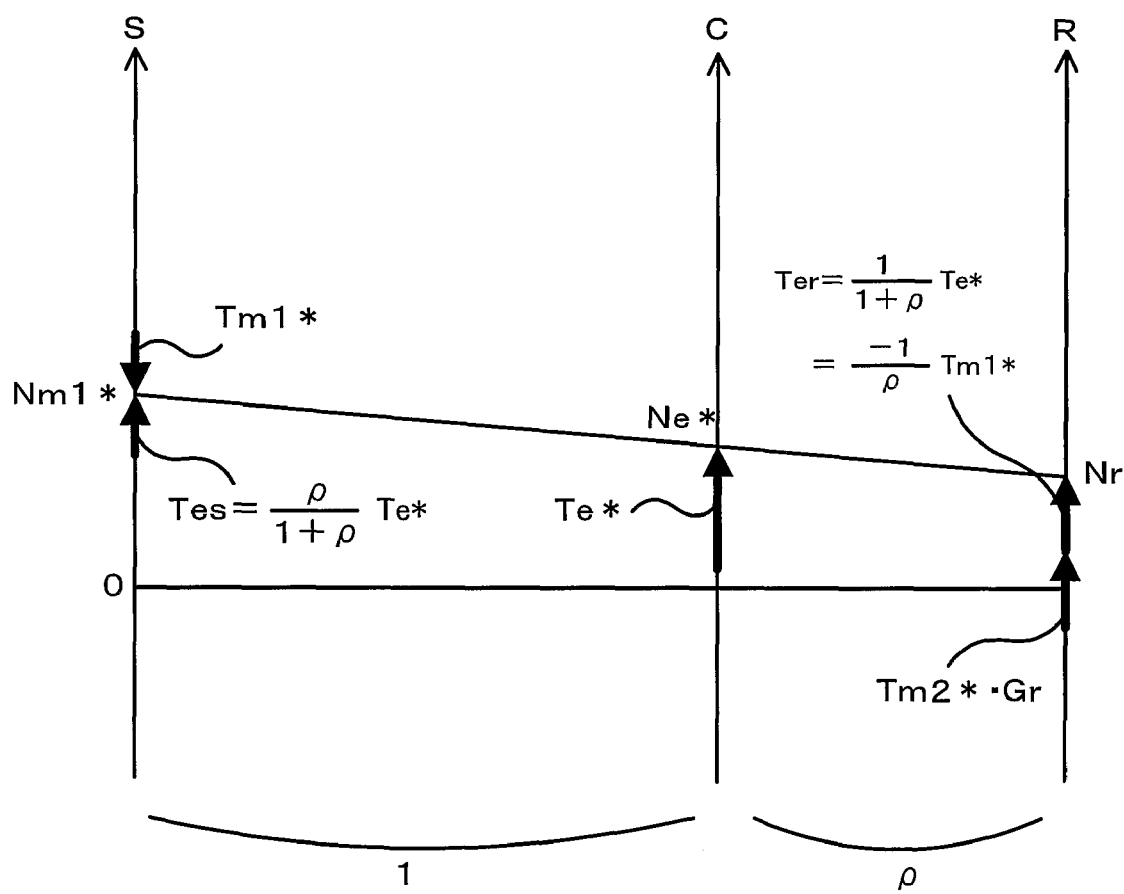
FIG. 5 is an alignment chart showing torque-rotation speed dynamics of respective rotational elements of a power distribution integration mechanism included in the hybrid vehicle of the embodiment.

Equation (1) is a dynamic relational expression of the rotation elements included in the power distribution integration mechanism 30. FIG. 5 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a) obtained by dividing the rotation speed Nm2 of the motor MG2 by the gear ratio Gr of the reduction gear 35. Equation (1) is readily introduced from the alignment chart of FIG. 5. Two upward thick arrows on the axis 'R' in FIG. 5 respectively show a torque that is directly transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S150):

$$Tmin = (Win - Tm1^* \cdot Nm1)/Nm2 \tag{3}$$

$$Tmax = (Wout - Tm1^* \cdot Nm1)/Nm2 \tag{4}$$

The lower torque restriction Tmin and the upper torque restriction Tmax are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S160):

$$Tm2\text{tmp}=(Tr^*+Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S170). Setting the torque command Tm2* of the motor MG2 in this manner restricts the torque demand Tr* to be output to the ring gear shaft 32a or the driveshaft within the range between the input limit Win and the output limit Wout of the battery 50. Equation (5) is readily introduced from the alignment chart of FIG. 5.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S180) and exits from the drive control routine of FIG. 2. The engine ECU 24 receives the target rotation speed Ne* and the target torque Te* and performs fuel injection control and ignition control of the engine 22 to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

As described above, the hybrid vehicle 20 of the embodiment specifies the operation line L to give the greater torque in the low rotation speed area of the engine 22 at the higher vehicle speed V and controls the operation of the engine 22 according to the specified operation line L. The engine 22 can thus be driven at a high-efficiency drive point, while the driving-related background noise effectively masks some abnormal noise or muffled noise, which may be caused by the operation of the engine 22 in a low rotation speed-high torque area. This arrangement desirably prevents the driver and the other passenger from feeling odd and uncomfortable due to the abnormal noise or muffled noise and enhances the energy efficiency of the hybrid vehicle 20. As mentioned above, the vehicle speed V is regarded as the detection value representing the driving-related background noise or as the detection value used for estimating the driving-related background noise. The drive control of this embodiment specifies the operation line L to give the greater torque in the low rotation speed area with an increase in driving-related background noise and controls the operation of the engine 22 according to the specified operation line L. The engine 22 can thus be driven at a higher-efficiency drive point, while the driving-related background noise effectively masks some abnormal noise or muffled noise, which may be caused by the operation of the engine 22 in a low rotation speed-high torque area. This arrangement desirably prevents the driver and the other passenger from feeling odd and uncomfortable due to the abnormal noise or muffled noise and enhances the energy efficiency of the hybrid vehicle 20.

In the hybrid vehicle 20 of the embodiment, the vehicle speed V is regarded as the detection value representing the driving-related background noise or as the detection value used for estimating the driving-related background noise. The drive control of the embodiment accordingly specifies the operation line L to give the greater torque in the low rotation speed area of the engine 22 at the higher vehicle speed V and controls the operation of the engine 22 according to the specified operation line L. The factor of background noise represented by or estimated from the vehicle speed V is, however, not essential. The drive control may thus simply specify the operation line L to give the greater torque in the low rotation speed area of the engine 22 at the higher vehicle speed V without considering the background noise and control the operation of the engine 22 according to the specified operation line L.

Figure 6:
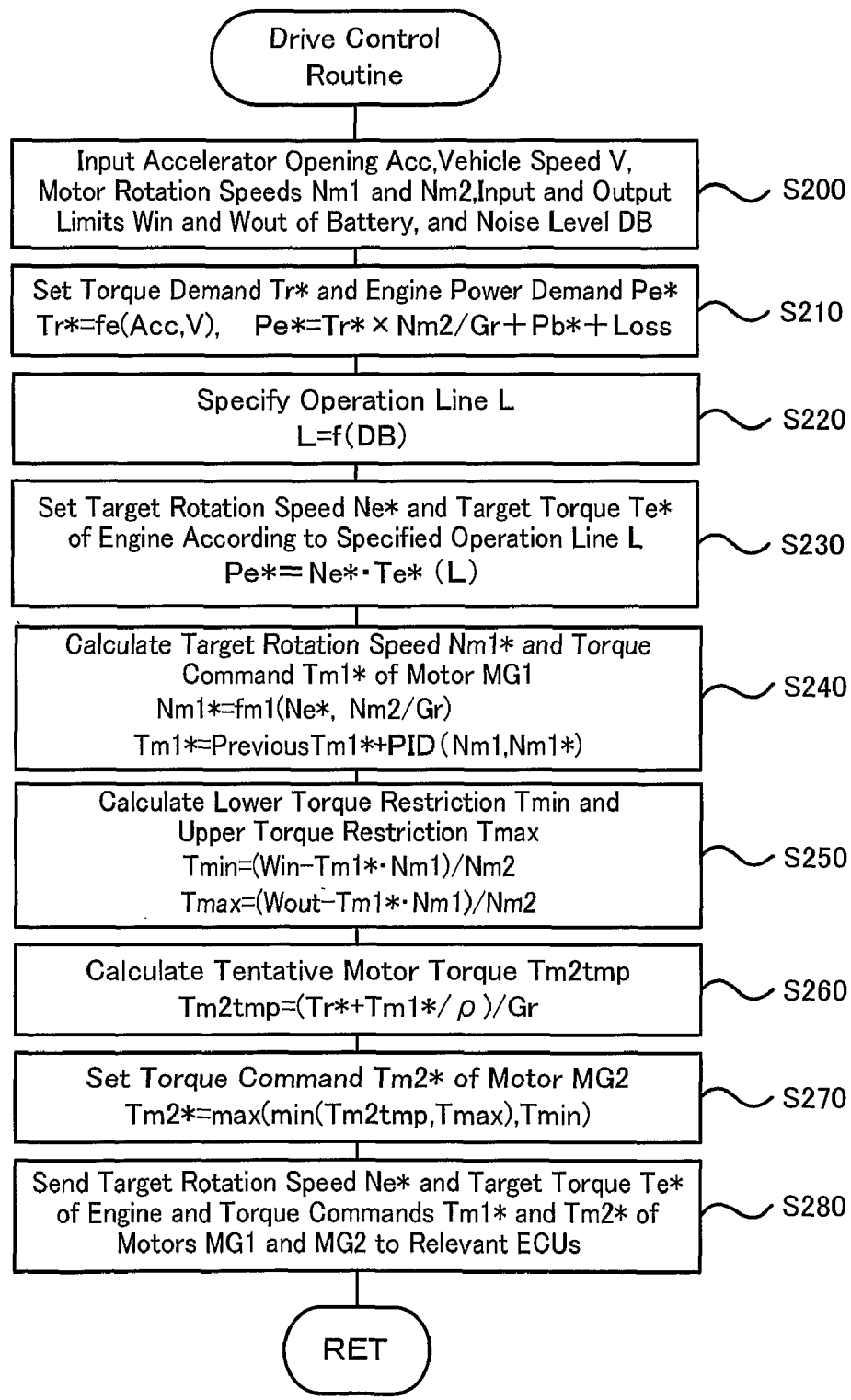
FIG. 6 is a flowchart showing a modified flow of the drive control routine.
Figure 7:
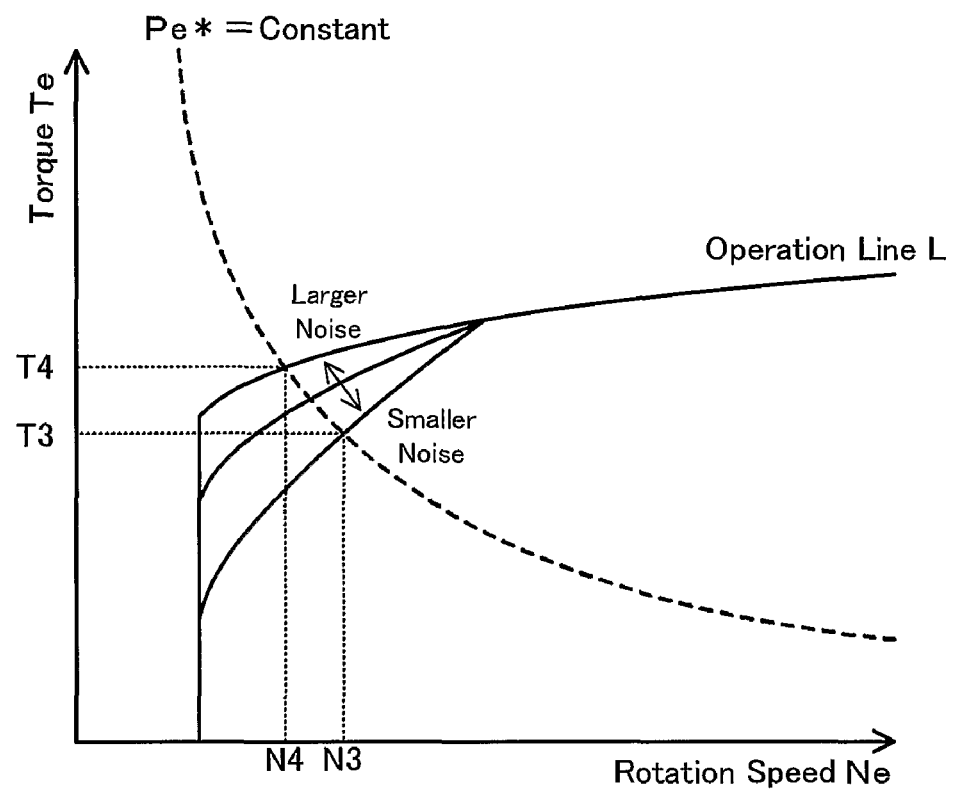
FIG. 7 shows operation lines L provided for different noise levels DB to set an operation point of the engine defined by a combination of rotation speed and torque.

The hybrid vehicle 20 of the embodiment specifies the operation line L to give the greater torque in the low rotation speed area of the engine 22 at the higher vehicle speed V and controls the operation of the engine 22 according to the specified operation line L. One possible modification of the drive control may actually detect the level of driving-related noise, specify an operation line L to give a greater torque in the low rotation speed area of the engine 22 at a higher noise level, and control the operation of the engine 22. For this modification, microphones for picking up noises are placed in an engine room and a passenger compartment of the vehicle. The modified drive control specifies an operation line used for setting a drive point of the engine 22, based on a noise level detected with the microphones. A drive control routine of such modification is shown in the flowchart of FIG. 6. The drive control routine of FIG. 6 is basically the same as the drive control routine of FIG. 2, except input of a noise level DB at step S200 and specification of an operation line L based on the input noise level DB at step S220. The drive control routine of FIG. 6 specifies the operation line L to give the greater torque in the relatively low rotation speed area out of the whole operation area of the engine 22 with an increase in noise level DB at step S220. FIG. 7 shows operation lines L provided for different noise levels DB to set an operation point of the engine 22 defined by a combination of rotation speed and torque. The drive control of this modified example specifies the operation line L based on the actual level of background noise and enables the background noise to more effectively mask the abnormal noise or muffled noise. This arrangement thus more effectively prevents the driver and the other passenger from feeling odd and uncomfortable due to the abnormal noise or muffled noise. In this modified example, the detected noise level DB does not include the engine noise due to the operation of the engine 22 required for driving the hybrid vehicle.

The drive control of this modified example specifies the operation line L based on the noise level DB detected with the microphones located in the engine room and the passenger compartment and controls the operation of the engine 22 according to the specified operation line L. As mentioned above, the hybrid vehicle 20 of the embodiment specifies the operation line L based on the vehicle speed V, which is used as the parameter representing the driving-related background noise or as the parameter for estimating the driving-related background noise, and controls the operation of the engine 22 according to the specified operation line L. In a similar manner, the modified drive control may specify the operation line L based on any parameter representing the driving-related background noise or parameter for estimating the driving-related background noise and control the operation of the engine 22 according to the specified operation line L. The modified drive control may specify the operation line L based on the vehicle speed V or any other suitable parameter, in addition to or in place of the detected noise level DB and control the operation of the engine 22 according to the specified operation line L.

Figure 8:
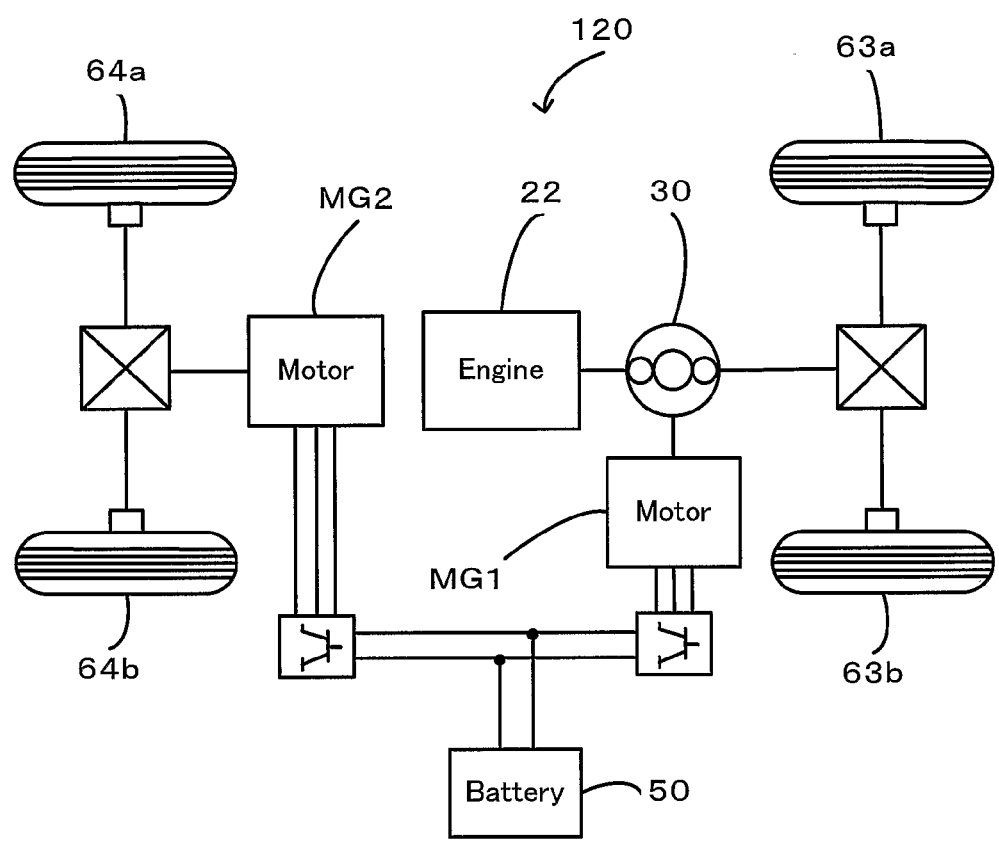
FIG. 8 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 8, the power of the motor MG2 may be output to another axle (that is, an axle linked with wheels 64a and 64b), which is different from an axle connected with the ring gear shaft 32a (that is, an axle linked with the wheels 63a and 63b).

Figure 9:
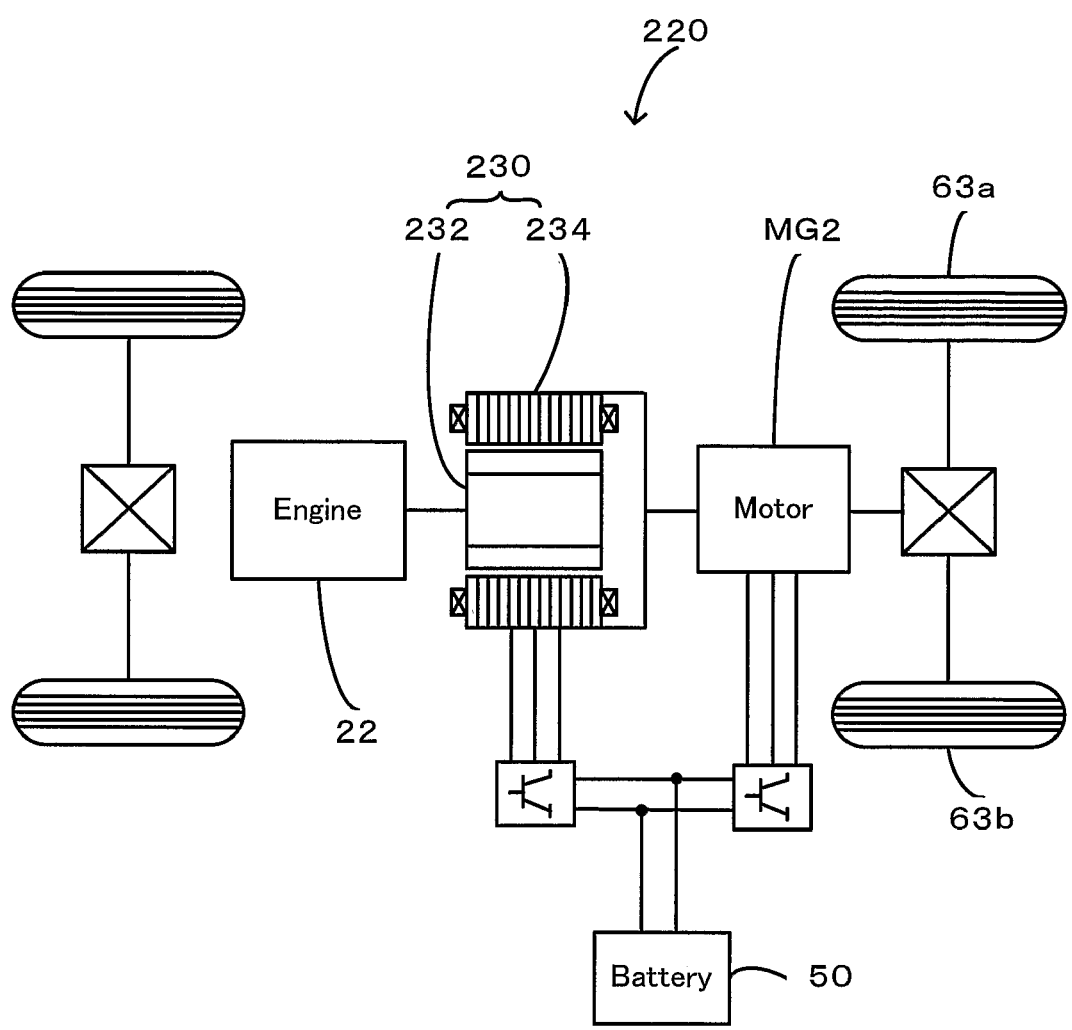
FIG. 9 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 9, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment and its modified examples described above regard the hybrid vehicles that specify an operation line L based on the background noise level DB or the vehicle speed V and control the operation of the engine 22 according to the specified operation line. The technique of the invention is, however, not restricted to such hybrid vehicles but is also actualized by control methods of such hybrid vehicles.

The embodiment and its modified examples discussed above are to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of hybrid vehicles and other relevant industries.

The invention claimed is:

1. A hybrid vehicle, comprising:
an internal combustion engine that includes an output shaft and outputs power;
an electric power-mechanical power input output mechanism that is connected to the output shaft of the internal combustion engine and to an axle of said hybrid vehicle and transmits at least part of output power of the internal combustion engine to the axle through input and output of electric power and mechanical power;
a motor configured to output power to drive said hybrid vehicle;
an accumulator unit that inputs and outputs electric power from and to the electric power-mechanical power input output mechanism and the motor;
a noise level detection module configured to detect a level of driving-related noise which is background noise associated with operation of the hybrid vehicle excluding engine noise;
a driving force demand setting unit configured to set a driving force demand required to drive said hybrid vehicle;
an operation restriction setting module configured to set an operation restriction to be imposed on operation of the internal combustion engine, based on the detected noise level, so as to increase a torque with an increase in the detected noise level in an operation area in which a rotation speed of the internal combustion engine is not higher than a preset reference rotation speed; and
a control module configured to control the internal combustion engine, the electric power-mechanical power input output mechanism, and the motor to operate the internal combustion engine with the imposed operation restriction and to drive said hybrid vehicle with a driving force equivalent to the set driving force demand.

2. A hybrid vehicle in accordance with claim 1, wherein said operation restriction setting module sets the operation restriction, which is to be imposed on the operation of the internal combustion engine, so as to enhance an efficiency of the internal combustion engine for a fixed output level with an increase in detected noise level.

3. A hybrid vehicle in accordance with claim 1, wherein said operation restriction setting module sets the operation restriction, which is to be imposed on the operation of the internal combustion engine, so as to increase a torque in a low rotation speed area of the internal combustion engine, which is not higher than the preset reference rotation speed, with the increase in the detected noise level.

4. A hybrid vehicle in accordance with claim 1, wherein said operation restriction setting module sets the operation restriction, which is to be imposed on the operation of the internal combustion engine, so as to raise an allowable level of muffled noise caused by the operation of the internal combustion engine with an increase in detected noise level.

5. A hybrid vehicle in accordance with claim 1, wherein
said noise level detection module comprises a vehicle speed measurement unit that measures a vehicle speed of said hybrid vehicle, and
said noise level detection module sets a higher noise level that corresponds to a higher measured vehicle speed.

6. A hybrid vehicle in accordance with claim 1, wherein the electric power-mechanical power input output mechanism includes
a three shaft-type power input output module that is linked to three shafts, the output shaft of the internal combustion engine, the axle, and a rotating shaft, and inputs and outputs power from and to a residual one shaft based on powers input from and output to any two shafts among the three shafts; and
a generator that inputs and outputs power from and to the rotating shaft.

7. A hybrid vehicle in accordance with claim 1, wherein the electric power-mechanical power input output mechanism is a pair-rotor motor that includes a first rotor connected to the output shaft of the internal combustion engine and a second rotor connected to the axle, and is driven to rotate through relative rotation of the first rotor to the second rotor.

8. A hybrid vehicle in accordance with claim 1, wherein the driving-related noise is audible noise.

9. A hybrid vehicle, comprising:
an internal combustion engine that includes an output shaft and outputs power;
an electric power-mechanical power input output mechanism that is connected to the output shaft of the internal combustion engine and to an axle of said hybrid vehicle and transmits at least part of output power of the internal combustion engine to the axle through input and output of electric power and mechanical power;

a motor configured to output power to drive said hybrid vehicle;

an accumulator unit that inputs and outputs electric power from and to the electric power-mechanical power input output mechanism and the motor;

a driving force demand setting unit configured to set a driving force demand required to drive said hybrid vehicle;

a vehicle speed measurement unit that measures a vehicle speed of said hybrid vehicle;

an operation restriction setting module configured to set an operation restriction, which is to be imposed on operation of the internal combustion engine, so as to increase a torque in a low rotation speed area of the internal combustion engine, which is not higher than a preset reference rotation speed, with an increase in measured vehicle speed; and a control module configured to control the internal combustion engine, the electric power-mechanical power input output mechanism, and the motor to operate the internal combustion engine with the imposed operation restriction and to drive said hybrid vehicle with a driving force equivalent to the set driving force demand.

10. A hybrid vehicle in accordance with claim 9, wherein the electric power-mechanical power input output mechanism includes a three shaft-type power input output module that is linked to three shafts, the output shaft of the internal combustion engine, the axle, and a rotating shaft, and inputs and outputs power from and to a residual one shaft based on powers input from and output to any two shafts among the three shafts; and a generator that inputs and outputs power from and to the rotating shaft.

11. A hybrid vehicle in accordance with claim 9, wherein the electric power-mechanical power input output mechanism is a pair-rotor motor that has a first rotor connected to the output shaft of the internal combustion engine and a second rotor connected to the axle, and is driven to rotate through relative rotation of the first rotor to the second rotor.

12. A control method of a hybrid vehicle, said hybrid vehicle including an internal combustion engine that includes an output shaft and outputs power; an electric power-mechanical power input output mechanism that is connected to the output shaft of the internal combustion engine and to an axle of said hybrid vehicle and transmits at least part of output power of the internal combustion engine to the axle through input and output of electric power and mechanical power; a motor that configured to output power to drive said hybrid vehicle; and an accumulator unit that inputs and outputs electric power from and to the electric power-mechanical power input output mechanism and the motor, said control method comprising:

setting an operation restriction to be imposed on operation of the internal combustion engine, based on a level of driving-related noise which is background noise associated with operation of the hybrid vehicle excluding engine noise, so as to increase a torque with an increase in the detected noise level in an operation area in which a rotation speed of the internal combustion engine is not higher than a preset reference rotation speed; and controlling the internal combustion engine, the electric power-mechanical power input output mechanism, and the motor to operate the internal combustion engine with the imposed operation restriction and to drive said hybrid vehicle with a driving force equivalent to a driving force demand required to drive said hybrid vehicle.

13. A control method in accordance with claim 12, said control method further comprising:

setting the operation restriction, which is to be imposed on the operation of the internal combustion engine, so as to enhance an efficiency of the internal combustion engine for a fixed output level with an increase in level of driving-related noise and controlling the internal combustion engine, the electric power-mechanical power input output mechanism, and the motor.

14. A control method in accordance with claim 12, said control method further comprising:

setting the operation restriction, which is to be imposed on the operation of the internal combustion engine, so as to increase a torque in a low rotation speed area of the internal combustion engine, which is not higher than a preset reference rotation speed, with an increase in level of driving-related noise and controlling the internal combustion engine, the electric power-mechanical power input output mechanism, and the motor.

15. A control method in accordance with claim 12, said control method further comprising:

setting the operation restriction, which is to be imposed on the operation of the internal combustion engine, so as to raise an allowable level of muffled noise caused by the operation of the internal combustion engine with an increase in level of driving-related noise and controlling the internal combustion engine, the electric power-mechanical power input output mechanism, and the motor.

16. A control method in accordance with claim 12, said control method further comprising:

utilizing a vehicle speed of said hybrid vehicle as a parameter representing or implying the level of driving-related noise to set the operation restriction, which is to be imposed on the operation of the internal combustion engine, and controlling the internal combustion engine, the electric power-mechanical power input output mechanism, and the motor.

17. A control method of a hybrid vehicle, said hybrid vehicle including an internal combustion engine that includes an output shaft and outputs power; an electric power-mechanical power input output mechanism that is connected to the output shaft of the internal combustion engine and to an axle of said hybrid vehicle and transmits at least part of output power of the internal combustion engine to the axle through input and output of electric power and mechanical power; a motor configured to output power to drive said hybrid vehicle; and an accumulator unit that inputs and outputs electric power from and to the electric power-mechanical power input output mechanism and the motor, said control method comprising:

setting an operation restriction, which is to be imposed on operation of the internal combustion engine, so as to increase a torque in a low rotation speed area of the internal combustion engine, which is not higher than a preset reference rotation speed, with an increase in vehicle speed of said hybrid vehicle; and controlling the internal combustion engine, the electric power-mechanical power input output mechanism, and the motor to operate the internal combustion engine with the imposed operation restriction and to drive said hybrid vehicle with a driving force equivalent to a driving force demand required to drive said hybrid vehicle.

18. A hybrid vehicle, comprising:

an internal combustion engine that includes an output shaft and outputs power;

an electric power-mechanical power input output means for transmitting at least part of output power of the internal combustion engine to an axle of said hybrid vehicle through input and output of electric power and mechanical power, where the electric power-mechanical power input output means is connected to the output shaft of the internal combustion engine and to the axle;

a motor configured to output power to drive said hybrid vehicle;

an accumulator means for inputting and outputting electric power from and to the electric power-mechanical power input output means and the motor;

a noise level detection means for detecting a level of driving-related noise which is background noise associated with operation of the hybrid vehicle excluding engine noise;

a driving force demand setting means for setting a driving force demand required to drive said hybrid vehicle;

an operation restriction setting means for setting an operation restriction to be imposed on operation of the internal combustion engine, based on the detected noise level, so as to increase a torque with an increase in the detected noise level in an operation area in which a rotation speed of the internal combustion engine is not higher than a preset reference rotation speed; and a control means for controlling the internal combustion engine, the electric power-mechanical power input output means, and the motor to operate the internal combustion engine with the imposed operation restriction and to drive said hybrid vehicle with a driving force equivalent to the set driving force demand.

19. A hybrid vehicle, comprising:

an internal combustion engine that includes an output shaft and outputs power;

an electric power-mechanical power input output means for transmitting at least part of output power of the internal combustion engine to an axle of said hybrid vehicle through input and output of electric power and mechanical power, where the electric power-mechanical power input output means is connected to the output shaft of the internal combustion engine and to the axle;

a motor configured to output power to drive said hybrid vehicle;

an accumulator means for inputting and outputting electric power from and to the electric power-mechanical power input output means and the motor;

a driving force demand setting means for setting a driving force demand required to drive said hybrid vehicle;

a vehicle speed measurement means for measuring a vehicle speed of said hybrid vehicle;

an operation restriction setting means for setting an operation restriction, which is to be imposed on operation of the internal combustion engine, so as to increase a torque in a low rotation speed area of the internal combustion engine, which is not higher than a preset reference rotation speed, with an increase in measured vehicle speed; and a control means for controlling the internal combustion engine, the electric power-mechanical power input output means, and the motor to operate the internal combustion engine with the imposed operation restriction and to drive said hybrid vehicle with a driving force equivalent to the set driving force demand.

* * * * *